J. W. BOPE.
Corn Harvester
No. 45,811.
2 Sheets—Sheet 1.
Patented Jan. 10, 1865.
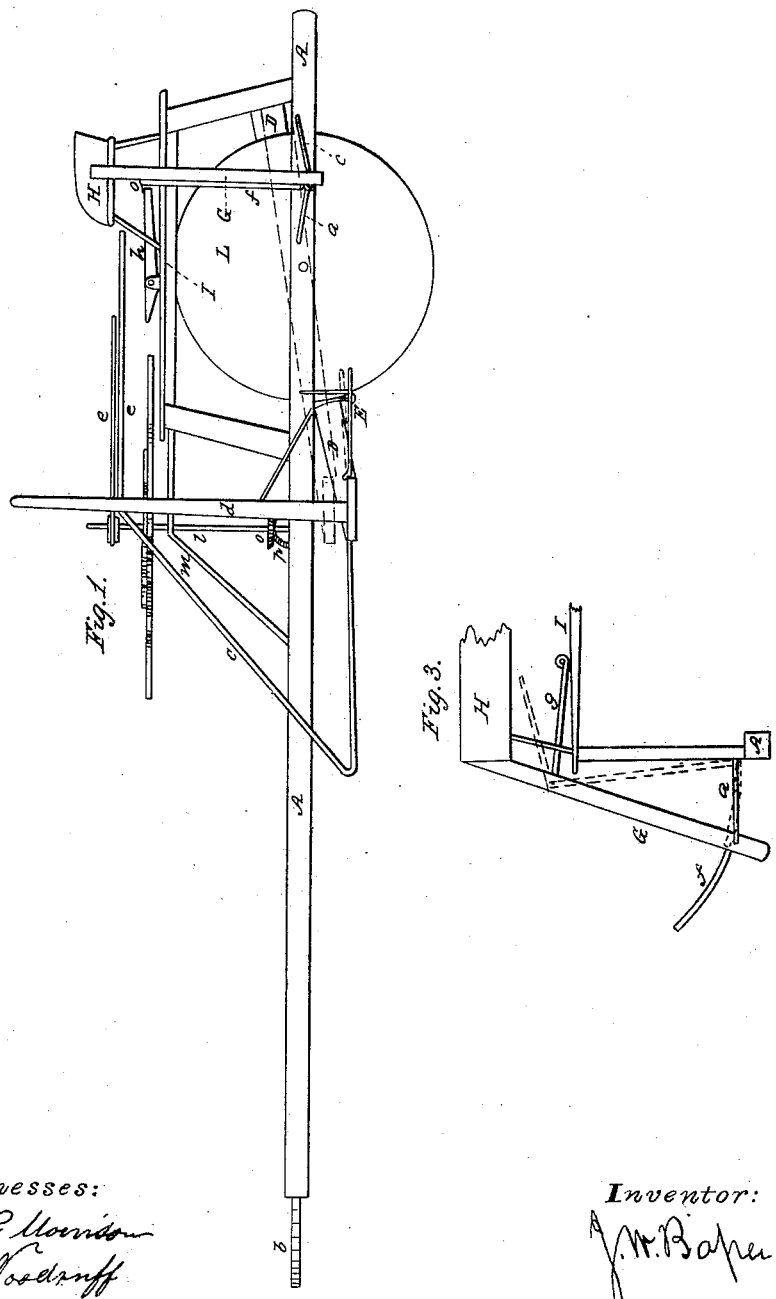
Witnesses:
Inventor:

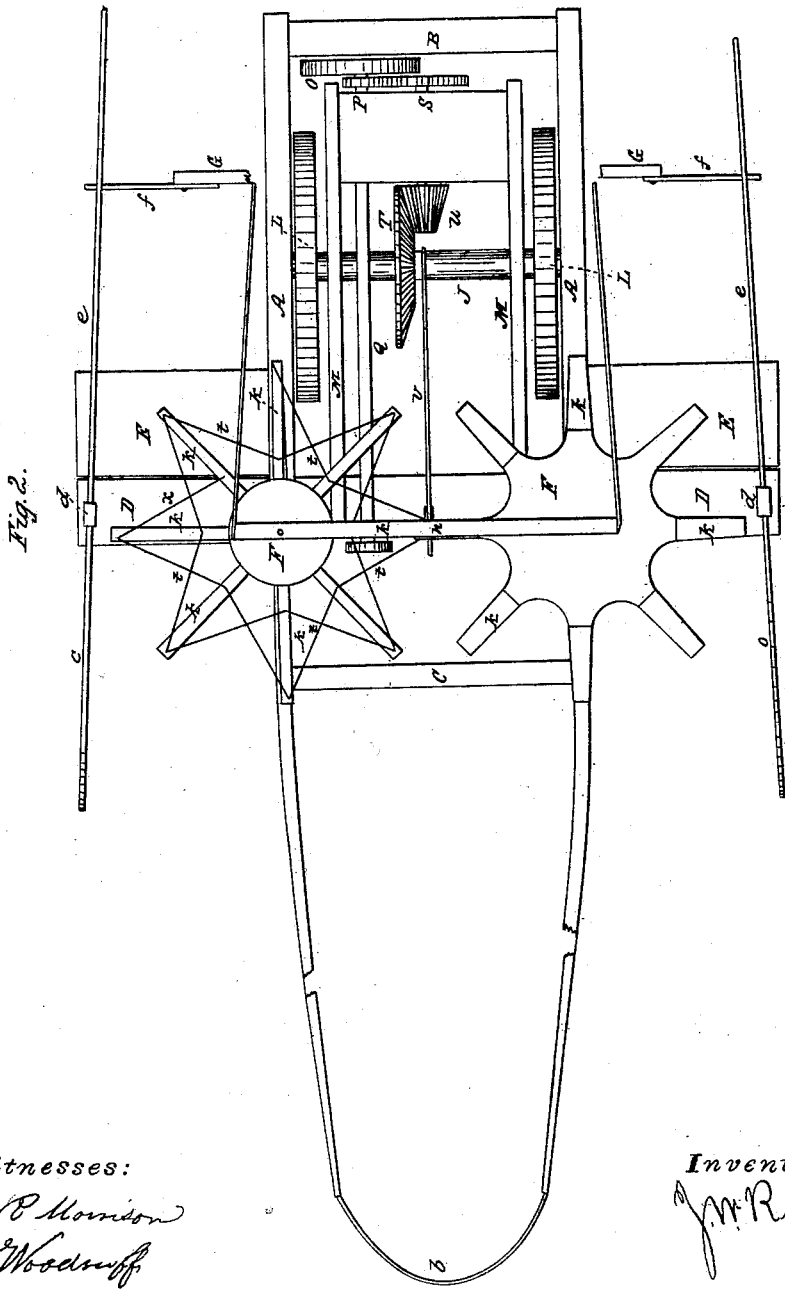

UNITED STATES PATENT OFFICE.

JACOB W. BOPE, OF ST. LOUIS, MISSOURI.

IMPROVEMENT IN CORN-HARVESTERS.

Specification forming part of Letters Patent No. 45,811, dated January 10, 1865.

*To all whom it may concern:*

Be it known that I, JACOB W. BOPE, of the city and county of St. Louis, in the State of Missouri, have invented certain new and useful Improvements in Corn-Harvesters; and I do hereby declare that the following is a full, clear, and exact description of the same, reference being had to the accompanying drawings, making a part of this specification, in which—

Figure 1 represents a side elevation of the machine. Fig. 2 shows a plan or top view of the same with differently-constructed reels or corn-gatherers. Fig. 3 shows a detached section of the cut-corn holding and gavel-dropping mechanism.

The object of my invention is to furnish the corn-growers with a simple, practical, and complete corn cutting and gaveling machine—one that is easily operated by one or two horses and a driver.

My invention consists in running wires through six or eight straight reel-arms, the wires crossing each other at such angles as to form guides to conduct the corn to the action of the cutters and freeing the reel-arms from the cut corn instantly; and, furthermore, the application of an apparatus for forming gavels of the cut corn and dropping the same on each side of the machine, to be operated by the hand or foot at the will of the driver.

To enable others skilled in the art to make and use my improved corn-harvester, I will describe it in detail, referring to the drawings and to the letters marked thereon.

The shafts A A extend the whole length and form the side timbers, which are the main portion of the frame, they being connected and secured together at the proper distance by a bar, B, at the rear end, and a corresponding bar, C, forward in the proper place to attach the whiffletree. The shafts have at their forward ends a connecting-rod of iron, $b$, which may be the section of a cone or semicircle, which, being in front of the horse, separates the rows and prevents the standing corn from getting in between the horse and the shafts, and is properly guided to the gathering-reels F F and to the cutters, which operate on the cross-bar D D, the same being secured to the frame M M, which is so balanced on the main shaft or axle J that the bar D may be elevated and depressed at will, and secured in position by a lever and pin to the frame A A. On the extreme ends of the cross-bar D D are vertical standards $d\ d$, to which are attached iron braces and guiding-rods $c\ c$, and also rear guides, $e\ e$.

Directly in the rear of the cutters, to the cross-bar D are hinged movable self-adjusting wings or tables E E, for the purpose of supporting the butt-ends of the corn after it is cut and liberated from the reels F F, and falls onto the sliding or oscillating rods $f\ f$, where the cut corn is retained until a sufficient quantity for a gavel has accumulated, when the rods $f\ f$ are drawn in toward the frame A by the action of the driver and the gavels on both sides are dropped in a line parallel with the rows from which the corn was cut, the tables E being so hinged as to rise and fall over the stubble in passing.

The iron rod $f$ and apparatus for forming and dropping the gavel is more particularly shown in Fig. 3. It is constructed by placing a bar or light timber, G, in an inclined position on both sides of the machine, the top ends being secured to the driver's seat H, the foot extending down to a level with the bottom of the frame A, and secured to it by iron rods $a\ a$, the bar or timber G being a sufficient distance from the frame to allow the sliding rods $f\ f$ to draw in toward the frame until their ends are brought within the line of the inclined timbers G and the gavels drop off, the iron rods $f\ f$ being curved and secured to the timber G in such a position that the arm $g$ being coupled with a treadle, $h$, on the platform I, the rod is thrown in or out instantly by the foot of the driver, the seat H being elevated and made adjustable by sliding on the platform I, so that the driver can place himself in a position to balance the machine on the axle J and wheels L L.

The reels F are constructed by having not less than six or eight straight arms, $k\ k\ k\ k\ k$, placed upon vertical shafts $l\ l$, which have their bearings in boxes on the frame A A, nearly over the line of the cutters, they being supported above by bearings in the braces $m\ n$, and are operated by bevel-gear wheels $o\ p$, driven by the belt $r$. The cutters are operated from the counter-shaft Q, on the rear end of which is a fly-wheel, O, and pinion $p$, connecting with the spur-gear wheel S, which has its power and motion from the bevel-gear T U, the whole of the driving mechanism, except the bevel-wheel T, being supported on the frame M, under the platform I, where it balances the machine on the axle, and is shielded from the smut and dust.

The peculiarity and utility of my improved reel or corn-gatherer F F consists in running wires *t t t t* through the radiating arms *k k k*, the wires crossing each other at such angles as to prevent the corn from falling toward the center, and freeing the reel-arms instantly from the cut corn as it falls onto the gaveling apparatus.

The utility of my mode of constructing the frame for corn-harvesters, and the arrangement of the other mechanism thereto, is that the timbers may all be small and light, and yet be sufficiently strong and durable, as there is no side draft in cutting two rows, the force against the cutters being directly on the frame in a line with the team, the whole being balanced and supported on the shaft or axle, the cutting and gaveling being effected close to the sides, and simultaneous on both sides.

In reference to the utility of my improved reel or corn-gatherer, I desire to add further that I have discovered that less than six arms require so much speed that they knock off the ears or break thin stalks or corn dried by the frost, while to have more than eight arms causes the reel to choke.

Having thus described my improvements in corn-harvesters, what I claim as my invention, and desire to secure by Letters Patent, is—

1. The sliding rod *f*, or its equivalent, provided with a foot-lever, in combination with the guide G and hinged table E, substantially as and for the purposes specified.

2. The rod F, provided with six or more straight arms, having one or more wires running through them, said wires crossing each other or being bent to form such angles that the stalks are gathered and discharged with ease and certainty, substantially as shown and described.

JACOB W. BOPE.

Witnesses:
ENOCH R. MORRISON,
J. B. WOODRUFF.